United States Patent Office 3,480,562
Patented Nov. 25, 1969

3,480,562
METHOD FOR FORMING OLEFIN POLYMERIZATION CATALYSTS
Erik Tornqvist, Roselle, N.J., assignor to Esso Research and Engineering Company, a corporation of Delaware
No Drawing. Continuation-in-part of application Ser. No. 536,648, Mar. 23, 1966. This application Dec. 2, 1966, Ser. No. 598,594
The portion of the term of the patent subsequent to Jan. 17, 1984, has been disclaimed
Int. Cl. B01j 11/84
U.S. Cl. 252—429
9 Claims

ABSTRACT OF THE DISCLOSURE

Monoolefin and diolefin polymerization catalysts are formed by heating a transition metal trihalide with aluminum triiodide at temperatures in excess of 200° C. The product can then be activated with an organo-aluminum compound.

---

This application is a continuation-in-part of Ser. No. 536,648, filed Mar. 23, 1966 (now Patent No. 3,298,965), which is in turn a continuation-in-part of Ser. No. 87,781 (now abandoned), filed Feb. 8, 1961.

The present invention deals with a novel method for the formation of polymerization catalyst components suitable for use in polymerizing propylene and higher alpha monoolefins as well as diolefins. More particularly, the invention relates to reacting a trihalide of a heavy transition metal with a halide of a Group II or III metal so as to form a co-crystalline material which can thereafter be activated with an organo-metallic compound and employed for the polymerization of alpha olefinically unsaturated hydrocarbons at moderate pressures.

There has been increasing interest in means for polymerizing propylene and higher alpha olefins as well as aliphatic diolefins. Many catalysts suitable for the polymerization of ethylene, such as $TiCl_2$, with or without activating compounds, have failed to successfully polymerize higher olefins to give solid polymers, particularly with respect to obtaining polymers of high crystallinity. Among the various catalyst systems for polymerizing alpha olefinically unsaturated hydrocarbons, a Ziegler-type catalyst, i.e., a reduced heavy transition metal halide activated with an organo-aluminum compound, has been of particular interest. However, the art is continuously searching for new catalyst systems suitable for the polymerization of alpha olefins and diolefins. Systems employing commercially available materials are particularly desired.

In its broadest aspect, the present invention involves contacting trihalides of heavy transition metals, such as titanium trichloride, titanium tribromide, vanadium trichloride, titanium triiodide, etc., with a halide of a Group II or Group III metal, e.g., aluminum trichloride, aluminum tribromide, aluminum triiodide, zinc dichloride, magnesium dichloride, gallium trichloride, etc., at a temperature above 200° C., e.g. 200° to 500° C., for a time sufficient to form a co-crystalline material. The co-crystalline material can thereafter be activated with an organo-aluminum compound and employed for the polymerization of propylene, butadiene-1,3 and other alpha olefinically unsaturated hydrocarbons.

In one embodiment, titanium trichloride is contacted with aluminum trichloride at a temperature of at least 200° C. to form a co-crystalline material containing titanium chloride and aluminum trichloride; which material can thereafter be activated with an organo-aluminum compound. It is further preferred to homogenize the co-crystalline material prior to activation with an organo-aluminum compound by means of dry ball milling in an inert atmosphere for a suitable time, e.g. for 10 minutes to about 10 days, the most suitable time being dependent on the intensity of the milling. Other types of grinding, such as vibromilling, may also be successful employed in this step provided the material can be properly protected from exposure to moisture, oxygen, and other catalyst poison.

In another embodiment of the present invention, the transition metal trihalide is contacted with the Group II–III metal halide at temperatures of at least 200° C. in the presence of aluminum metal. In this embodiment, about 0.01 to 0.2 mole of aluminum are employed per mole of transition metal trihalide, e.g. titanium trichloride. The other reaction conditions used are the same as employed in the reaction of the transition metal compound with a Group II–III metal halide alone.

It is not necessary that the halogen substituents of the transition metal trihalide and the Group II–III metal halide be identical. Materials such as vanadium tribromide can be reacted with aluminum trichloride at temperatures of at least 200° C. to form a co-crystalline material which has utility as a catalyst component. In similar fashion, titanium trichloride can be reacted with aluminum triiodide to form a co-crystalline material containing titanium trichloride and aluminum iodide. Since titanium triiodide is a very unstable compound which can be obtained in reasonably pure form only with the utmost difficulty, when $TiI_3$ is to be the transition metal component it is preferred to form this compound in situ by reduction of $TiI_4$ with a Group II or III metal, preferably aluminum, during the elevated temperature reaction with the Group II–III metal halide. The amount of Group II–III metal used in the in situ reduction of $TiI_4$ should be sufficient to reduce the bulk of the $TiI_4$ to $TiI_3$. Generally, stoichiometric or excess amounts of metal are employed. Co-crystalline materials containing aluminum triiodide are particularly effective in promoting the polymerization of $C_4$ and higher diolefins, particularly aliphatic diolefins such as butadiene and piperylene, to high molecular weight rubbery solids.

The transition metal compound and Group II–III metal halide may be contacted by various means. For example, finely divided titanium trichloride may be sprayed into an atmosphere of aluminum chloride gas above about 200° C. Alternatively, solid aluminum chloride may be contacted with solid titanium trichloride and the total mixture heated to a temperature of at least 200° C. In general, the transition metal trihalide, e.g. titanium trihalide, is contacted with from 0.1 to 1000 mole percent, preferably 5 to 500 mole percent, based on transition metal halide, of Group II–III metal halide, e.g. aluminum trichloride or aluminum triiodide. Temperatures of from 200° C. to 500° C., preferably 250° to 450° C., and pressures of about 15 to 750 p.s.i., preferably 20 to 100 p.s.i., are employed during the reaction of titanium trihalides and aluminum halides.

The particularly desirable catalyst component compositions formed in accordance with the above methods by a suitable adjustment of the proportions of materials employed during reaction, are defined by the following formula:

$$TiX_n \cdot xAlY_3$$

wherein X and Y are chlorine, bromine or iodine and may be the safe or different halogen moiety, $n$ varies from 2.7 to 3.0 and $x$ varies from 0.1 to 10, preferably 0.2 to 5.

Compositions which find the greatest utility as components in a catalyst system for the polymerization of aliphatic monoolefins are defined by the following formula:

$$TiCl_n \cdot xAlY_3$$

wherein Y is chlorine or iodine, preferably chlorine, $n$ ranges from 2.7 to 3.0 and $x$ varies from 0.1 to 0.5.

Compositions formed in accordance with the above methods that are particularly useful as components in catalyst systems used to promote the polymerization of aliphatic diolefins are defined by the following formula:

$$TiX_n \cdot xAlI_3$$

wherein X may be chlorine, bromine or iodine, $n$ varies from 2.7 to 3.0, and $x$ varies from 1 to 10, preferably from 2 to 5.

The present means of forcing co-crystalline catalyst components offers several important advantages. Titanium trihalides, with the exception of $TiI_3$, are readily available commercially. Titanium trichloride is normally prepared by the reduction of titanium tetrachloride with hydrogen or titanium at a temperature of about 400° to 1000° C. Thus, with the exception of $TiI_3$, one wishing to employ the present catalyst composition need not start with unreduced transition metal halides, such as titanium tetrachloride, and carry out a reduction at a very high temperature, nor encounter the highly exothermic reactions and great heat transfer problems characteristic of the reduction of a titanium tetrahalide. Another advantage is that the catalyst components prepared according to this invention will not normally contain significant amounts of hydrocarbon-soluble transition metal tetrahalides, such as $TiCl_4$, $TiBr_4$, $VCl_4$, etc. By contrast, preparations made by high temperature reduction of these halides usually contain some unreacted halide, which will usually have a detrimental effect on both catalyst activity and stereospecificity of the polymeric product secured. Although it is often possible to remove most of the unreacted soluble transition metal tetrahalide, such removal is generally cumbersome and usually involves thorough washing with a pure inert diluent followed by drying in vacuo. These steps are, of course, eliminated in the process according to this invention.

The present invention is clearly distinguished from various prior art procedures which bear a superficial resemblance to it. For example, Fischer (German Patent 874,215) indicates that aluminum chloride in combination with titanium tetrachloride (plus the optional presence of aluminum) serves as a catalyst for the polymerization of ethylene. However, the reaction of aluminum trichloride and titanium tetrachloride does not give a co-crystalline product, nor a catalyst component suitable for the polymerization of propylene and higher alpha olefins to highly crystalline polymers. Moreover, Fischer does not contemplate further reaction of the aluminum chloride-titanium tetrachloride product with an aluminum alkyl. Similarly, U.S. Patent 2,889,416 indicates that aluminum chloride and titanium dichloride serve as a catalyst for the polymerization of ethylene. Such a catalyst system is not suitable for the polymerization of propylene and higher olefins. Moreover, patentees do not contemplate the formation of a co-crystalline titanium chloride aluminum chloride catalyst component, nor do they appreciate the necessity for further activation of the catalyst component.

The co-crystalline material formed by the reaction of transition metal trihalides with Group II–III metal halides may be activated by any of the various organo-metallic compounds of a metal selected from Groups I to III of the Mendeleev Periodic Table. Organo-aluminum compounds, particularly aluminum alkyls, are preferred. Aluminum alkyl compositions containing 1 to 20 carbon atoms per alkyl group, preferably 2 to 8 carbon atoms per alkyl group, are especially desirable. Various aluminum dialkyl monohalides and, in some cases, monoalkyl aluminum dihalides may also be used. In general, compounds having the structural formula $AlR_3$ and $AlR_2X$ may be employed wherein R is an alkyl group and X is a halogen atom, secondary amine radical, mercaptan radical, etc. Useful compounds include: aluminum triethyl, aluminum triisobutyl, aluminum diethyl monochloride, aluminum diethyl monobromide, aluminum ethyl propyl monochloride, aluminum tripropyl, aluminum trihexyl, and aluminum ethyl dichloride.

The thus activated catalyst is then used to polymerize monoolefins and diolefins under relatively low pressure conditions. Typically, polymerization is carried out at a temperature of 0° to 120° C., preferably 50° to 100° C. Pressures are preferably atmospheric, but may vary from subatmospheric to as much as 200 p.s.i.g. or more. In general, typical low pressure conditions are employed in the polymerization step.

The present catalyst compositions are particularly suitable for polymerizing alpha olefins characterized by the following structural formula:

$$RCH=CH_2$$

wherein R is a $C_1$ to $C_{20}$ alkyl, alicyclic or aryl group. Examples of suitable olefins which may be polymerized or copolymerized via the use of the present catalyst systems are: propylene, butene-1, pentene-1, hexene-1, decene-1, dodecene-1, tetradecene-1, hexadecene-1, octadecene-1, vinylcyclohexane, and styrene. It should be recognized that the catalyst system of this invention may also be used for the polymerization of ethylene. As stated previously, compositions containing cocrystallized aluminum triiodide are also suitable for polymerizing diolefins, particularly aliphatic diolefins having from 4 to 8 carbon atoms.

The various aspects and modifications of the present invention may be more clearly apparent by reference to the following description and accompanying examples.

EXAMPLES 1 THROUGH 3

Commercial anhydrous titanium trichloride (95+% pure $TiCl_3$, produced by the Stauffer Chemical Company) was mixed with (a) aluminum powder, or (b) aluminum chloride, or (c) both of these compounds in a series of three experiments. The relative quantities of titanium trichloride, aluminum powder and aluminum chloride employed are indicated in Table I along with the reaction conditions utilized. Each of the three charges of titanium trichloride and aluminum chloride and/or aluminum, in sealed Pyrex tubes was heated inside a nitrogen pressured (25 p.s.i.g.) rocking steel bomb to temperatures in excess of 200° C. to cause a reaction (in dry state) to take place with the consequent formation of a co-crystalline material, the composition of which is indicated in the table. After having been cooled, the tubes were removed and the dry purplish to brownish violet reaction products recovered inside a dry box. The yields were close to quantitative. A 150 g. sample of each preparation was then steel ball milled dry for 6 days in a quart steel jar employing ⅜-inch diameter steel balls. The co-crystalline materials were then ready for testing as polymerization catalyst components.

TABLE I

| | Example No. | | |
|---|---|---|---|
| | I(a) | II(b) | III(c) |
| Starting Materials: | | | |
| $TiCl_3$ g | 154.3 (1 mole) | 154.3 | 154.3 |
| $AlCl_3$, g | | 26.7 (0.2 mole) | 17.8 (2/15 mole) |
| Al, g | 1.8 (1/15 mole) | | 1.8 |
| Ti/Al Molar Ratio | 1/0.067 | 1/0.2 | 1/0.2 |
| Reaction Conditions: | | | |
| Temperature, °C | 350 | 400 | 355 |
| Time, hrs | 16 | 16 | 16 |
| Composition of Product | $TiCl_{2.8} \cdot 0.67 AlCl_3$ | $TiCl_3 \cdot 0.2 AlCl_3$ | $TiCl_{2.8} \cdot 0.2 AlCl_3$ | a Reaction believed to be: $15 TiCl_3 + Al \rightarrow 15 (TiCl_{2.8} \cdot 0.067 AlCl_3)$.
b Reaction believed to be: $5 TiCl_3 + AlCl_3 \rightarrow 5 (TiCl_3 \cdot 0.2 AlCl_3)$.
c Reaction believed to be: $15 TiCl_3 + 2 AlCl + Al_3 \rightarrow 15 (TiCl_{2.8} \cdot 0.2 AlCl_3)$.

The above experiments illustrate the reaction of titanium trichloride with aluminum chloride and/or aluminum to form titanium chloride co-crystallized with aluminum chloride. Examples 2 and 3 further illustrate the formation of a co-crystalline material represented by the formula:

$$TiCl_n \cdot O \cdot 2AlCl_3$$

wherein $n$ varies from 2.8 to 3.

EXAMPLES 4 THROUGH 7

The catalyst components of Examples 1–3, together with commercial titanium trichloride (unmodified but ball milled), were then activated with aluminum triethyl and used to polymerize propylene under atmospheric pressure conditions. The relative amounts of the various components are indicated in Table II. The polymerizations were carried out for 1 hour at 75° C. with one liter of xylene being used as the diluent. Sufficient propylene was added so that at least 10% was unabsorbed and withdrawn as effluent, thus insuring constant and maximum monomer concentration throughout the polymerization.

The results secured by catalysts prepared in accordance with the present invention (Examples 6 and 7) as compared with the use of commercial titanium trichloride, and titanium trichloride reacted only with aluminum are indicated in Table II.

rocking steel bomb and then heated at 300° C. for the number of 24 hour reaction periods designated in the table, causing reaction to take place (in the dry state) with the consequent formation of a cocrystalline material. After the completion of a 24 hour reaction period, the glass tube was permitted to cool and removed from the steel bomb. Thereafter, the tube contents were intensely agitated to break up the material inside the tube to affect homogenization of the reagents. This procedure was repeated after each 24-hour reaction period. Following completion of the reaction, the product was recovered inside a nitrogen containing dry box. In each instance, a dark violet material was recovered in essentially quantitative yield. The cocrystalline character of the materials formed was established through X-ray diffraction analysis.

TABLE III

|  | Example No. | | |
| --- | --- | --- | --- |
|  | VIII | IX | X |
| Charge, g.: |  |  |  |
| TiI$_4$ | 138.9 | 111.1 | 55.6 |
| AlI$_3$ |  | 54.5 | 109 |
| Al | 2.25 | 1.8 | 0.9 |
| Ti/Al Molar Ratio | 1/0.33 | 1/1 | 1/3 |
| Reaction Conditions: |  |  |  |
| Temperature, ° C | 300 | 300 | 300 |
| Number of 24 hr. Reaction Periods | 2 | 3 | 2 |
| Composition of Product | TiI$_3$0.33AlI$_3$ | TiI$_3$.AlI$_3$ | TiI$_3$.3AlI$_3$ |

The above experiments demonstrate the reaction for the formation of titanium triiodide containing compositions through the in situ formation of titanium triiodide. The examples further demonstrate that cocrystallized compositions containing varying amounts of aluminum triiodide can be formed.

EXAMPLES 11 THROUGH 13

Portions of the catalyst compositions of Examples 8–10 along with 100 milliliters of benzene were charged to

TABLE II

|  | Example No. | | | |
| --- | --- | --- | --- | --- |
|  | IV | V | VI | VII |
| Catalyst, Titanium Chloride Component: |  |  |  |  |
| Preparation (Example No.) (a) | Commercial | I | II | III |
| Composition | TiCl$_3$ | TiCl$_{2.8}$0.067 AlCl$_3$ | TiCl$_3$0.2 AlCl$_3$ | TiCl$_{2.8}$.0.2 AlCl$_3$ |
| Weight, g | 0.386 | 0.390 | 0.453 | 0.435 |
| AlEt$_3$ g | 0.57 | 0.552 | 0.513 | 0.513 |
| Al/Ti Ratio (b) | 2 | 2 | 2 | 2 |
| Results: |  |  |  |  |
| Yield, g | 40.1 | 42.0 | 59.0 | 61.9 |
| Wax Polymer, percent | 2.5 | 3.1 | 2.0 | 2.6 |
| Catalyst Efficiency, g./g. (d) | 42.0 | 44.6 | 61.1 | 65.3 |
| Properties of Solid Polymer, Molecular Weight×10$^{-3}$ (e) | 200 | 195 | 205 | 230 | a All preparations were steel ball milled dry for 6 days before being tested.
b Includes Al in TiCl$_n$.xAlCl preparations.
c According to the Harris correlation, J. Polym. Sci., 8, 360 (1952).
d Defined as grams of total polymer per gram of total catalyst.

As shown in the table, catalysts prepared in accordance with the present invention (Examples 6 and 7) when used to polymerize propylene gave improved yields and catalyst efficiencies while forming highly crystalline polypropylene.

EXAMPLES 8 THROUGH 10

Commercial titanium tetraiodide was mixed with either aluminum powder or a mixture of aluminum powder and aluminum triiodide in a series of three experiments to demonstrate the formation of titanium triiodide cocrystallized with varying amounts of aluminum triiodide. The relative quantities of titanium tetraiodide, aluminum powder and aluminum triiodide employed and the reaction conditions used are indicated in Table III. In each of the three experiments, the reagents were charged inside a nitrogen containing dry box to a 35 mm. outside diameter, thick walled Carius tube made of Pyrex glass having a volume of about 150 milliliters. The tube was then sealed under vacuum conditions, transferred to a 300 milliliter carefully dried 8 ounce wide mouth glass bottles inside a nitrogen containing dry box. Thereafter, 15 grams of butadiene-1,3 was added to the catalyst-diluent mixture followed by a triethyl aluminum activator which was added as a one molar solution in benzene. Upon addition of the activators, a rapid polymerization reaction commenced causing the temperature of the bottles to rise to about 40 to 50° C. before the bottles could be placed on a finger type shaker. The polymerization reactions were conducted at room temperature with constant agitation for the period of time set forth in Table IV. In every instance, the polymerization mixture became gradually more viscous until the reaction mixture essentially ceased flowing after from 30 to 60 minutes of reaction time.

Upon completion of the reaction, the catalyst was decomposed and solubilized by the addition of 2 milliliters of a 0.2 molar solution of sodium isopropoxide in isopropanol. The high molecular weight polymer was precipitated from the reaction mixture, washed with isopropanol, treated with phenyl beta-naphthylamine and dried under vacuum conditions. The catalyst concentrations, polymerization conditions, and the properties of the products secured are set forth in Table IV below.

TABLE IV

| | Example No. | | |
|---|---|---|---|
| | XI | XII | XIII |
| Catalyst, Solid Component Type | $TiI_3 \cdot 0.33AlI_3$ | $TiI_3 \cdot AlI_3$ | $TiI_3 \cdot 3AlI_3$ |
| Weight | 14.1 | 20.9 | 41.3 |
| $AlEt_3$, mg | 7.62 | 5.7 | 14.3 |
| Al/Ti Ratio (a) | 3 | 3 | 8 |
| Polymerization Time, hrs | 4 | 2 | 4 |
| Results: | | | |
| High Mol. Wt. Polymer, g | 13.4 | 12.9 | 12.6 |
| Mol. Wt. of High Polymer × $10^{-3}$ (b) | 405 | 490 | 380 |
| Cis-1, 4 content of High Mol. Wt. Polymer, percent (c) | 93.8 | 95.1 | 92.6 | a Includes $AlI_3$ in the solid catalyst component.
b The inherent viscosity (I.V.) was first determined on a polymer solution in toluene at 25° C. The molecular weight was then calculated from the relationship $[I.V.] \cong [\eta] = 1.53 \times 10^{-4} (MW^{0.8})$ (Johnson, B. L. and Wolfangel, R. D., Ind. Eng. Chem. 44, 752 (1952)).
c Determined from the IR absorption spectrum obtained on a 1% (wt./vol.) solution of polymer in $CS_2$.

The above experiments demonstrate the utility of the cocrystallized catalyst compositions formed according to the process of this invention for promoting the polymerization of aliphatic diolefins. In particular, it should be recognized that extremely high yields of high molecular weight polybutadiene having a high cis-1,4 content was obtained with their use.

EXAMPLES 14 AND 15

To illustrate the utility of cocrystallized compositions wherein the halogen moiety of the transition metal compound is not identical to the halogen moiety of the aluminum compound, catalyst components were prepared by heating together titanium trichloride and aluminum triiodide at 300° C. and subsequently used as a catalyst component in a butadiene polymerization. The polymerization test was conducted in a 1-liter glass reaction vessel that was agitated by being placed on a paddle wheel stirrer in a temperature controlled water bath.

The reaction system was prepared by introducing the cocrystallized catalyst component and 500 milliliters of benzene into the reaction vessel inside a nitrogen containing dry box. To this mixture was then added 100 grams of butadiene-1,3. Thereafter there was added an alkyl aluminum activator. Upon completion of the reaction, the catalyst was decomposed and deactivated by the addition of 10 milliliters of a 0.2 molar solution of sodium isopropoxide in isopropanol. Thereafter, the high molecular polymer was recovered as described in the previous examples.

The results of the polymerization tests are set forth in Table V below:

TABLE V

| | Experiment No. | |
|---|---|---|
| | XIV | XV |
| Catalyst: | | |
| Solid Component Type | $TiCl_3 \cdot 5AlI_3$ | $TiCl_3 \cdot 3AlI_3$ |
| Weight, mg | 68.5 | 86 |
| $Al(C_2H_5)_3$, mg | 35.6 | 42.8 |
| Al/Ti Ratio (a) | 15 | 9 |
| Polymerization Time, hrs | 48 | 48 |
| Polymerization Temperature, ° C | 25 | 25 |
| Results: | | |
| High Mol. Wt. Polymer, g | 93.9 | 95.7 |
| Mol. Wt. × $10^{-3}$ (b) | 820 | |
| Cis-1,4 Content of Polymer (c) | 95.0 | 95.4 |

(a) Includes Al in both $AlR_3$ and $AlI_3$.
(b) See Footnote (b) of Table IV.
(c) See Footnote (c) of Table IV.

As shown in the above table, cocrystallized catalyst systems made up of constituents having different halogen moieties are highly effective in promoting the polymerization of butadiene to high molecular weight, stereoregular compositions.

Numerous modifications may be made to the present invention. Titanium trichloride and aluminum chloride may be reacted in various proportions to give various co-crystalline products. However, co-crystalline products which contain about 0.1 to 0.5 mole of aluminum chloride per mole of titanium trichloride are particularly useful as monoolefin polymerization catalysts. It is desirable to employ as a starting material a titanium halide containing 95 to 100% pure titanium trihalide.

The titanium halide may advantageously be reduced to a titanium valence below 3, preferably between about 2.7 and 3. As shown, this reduction can be easily carried out simultaneously with the incorporation of aluminum trihalide by adding a calculated amount of aluminum powder. Such additional reduction will also take care of the free titanium tetrahalide which may be present in commercial titanium trihalide preparations. Thus, the purity requirement for $TiCl_3$ used for catalyst preparation according to the latter method of this invention is lower than for $TiCl_3$ which is to be used directly in stereospecific polymerizations. Actually, $TiCl_4$ contaminations as high as 10% can be taken care of by adding a sufficient amount of aluminum to the $TiCl_3$-$AlCl_3$ charge before the preparation of the catalyst component. However, as noted previously, 95+% pure $TiCl_3$ is preferred for best results.

Having described the present invention, that which is sought to be protected is set forth in the following claims.

What is claimed is:
1. A method for preparing an improved olefin polymerization catalyst component comprising contacting a titanium trihalide with 0.1 to 1000 mol percent, based on titanium trihalide, of aluminum triiodide at a temperature of from 200° C. to 500° C. for a time sufficient to form a co-crystalline material.

2. A method of claim 1 wherein said titanium trihalide is selected from the group consisting of titanium trichloride and titanium triiodide.

3. The process of claim 2 wherein said catalyst component is thereafter activated with an organo-aluminum compound.

4. The process of claim 3 wherein said co-crystalline material is dry ball milled prior to admixing with said organo-aluminum compound.

5. The process of claim 3 wherein said organo-aluminum compound is triethyl aluminum.

6. The process of claim 2 wherein said transition metal halide is titanium trichloride.

7. The process of claim 2 wherein said transition metal halide is titanium triiodide.

8. The process of claim 7 wherein said titanium triiodide is formed in situ during said contacting with aluminum triiodide by reducing titanium tetraiodide with metallic aluminum.

9

9. The process of claim 6 wherein said catalyst component is thereafter activated with an organo-aluminum compound.

References Cited

UNITED STATES PATENTS 3,244,773  4/1966  Crouch _____ 260—894

3,118,729  1/1964  Kunner _____ 23—87
3,298,965  1/1967  Tornqvist _____ 252—429

PATRICK P. GARVIN, Primary Examiner

U.S. Cl. X.R.

23—87; 252—442; 260—93.5, 93.7, 94.3